United States Patent [19]

Thurgood

[11] 4,007,380
[45] Feb. 8, 1977

[54] CONTROL OF CHOKES

[75] Inventor: Garry Thurgood, Bagshot, England

[73] Assignee: The British Petroleum Company Limited, London, England

[22] Filed: Apr. 25, 1975

[21] Appl. No.: 571,696

[30] Foreign Application Priority Data

Apr. 29, 1974 United Kingdom ............ 18663/74

[52] U.S. Cl. ........................... 307/149; 340/239 R
[51] Int. Cl.² ........................................ G08B 21/00
[58] Field of Search .................. 307/149, 116, 121; 340/238, 239; 251/129

[56] References Cited
UNITED STATES PATENTS

| | | | |
|---|---|---|---|
| 3,594,557 | 7/1971 | Anderson | 340/239 R |
| 3,821,726 | 6/1974 | Chang et al. | 340/239 R |

Primary Examiner—Herman Hohauser
Attorney, Agent, or Firm—Morgan, Finnegan, Pine, Foley & Lee

[57] ABSTRACT

A well choke control apparatus comprising means for producing a first electrical signal indicative of a required position of the choke and means for deriving a second electrical signal indicative of the actual position of the choke. A comparator is arranged to be fed with the first and second electrical signals and to control actuation of the choke in the required direction to equalize said electrical signals. A number of override control arrangements may be provided to ensure that the choke is not opened or closed beyond predetermined safe limits and the main control comparator is self checking.

8 Claims, 10 Drawing Figures

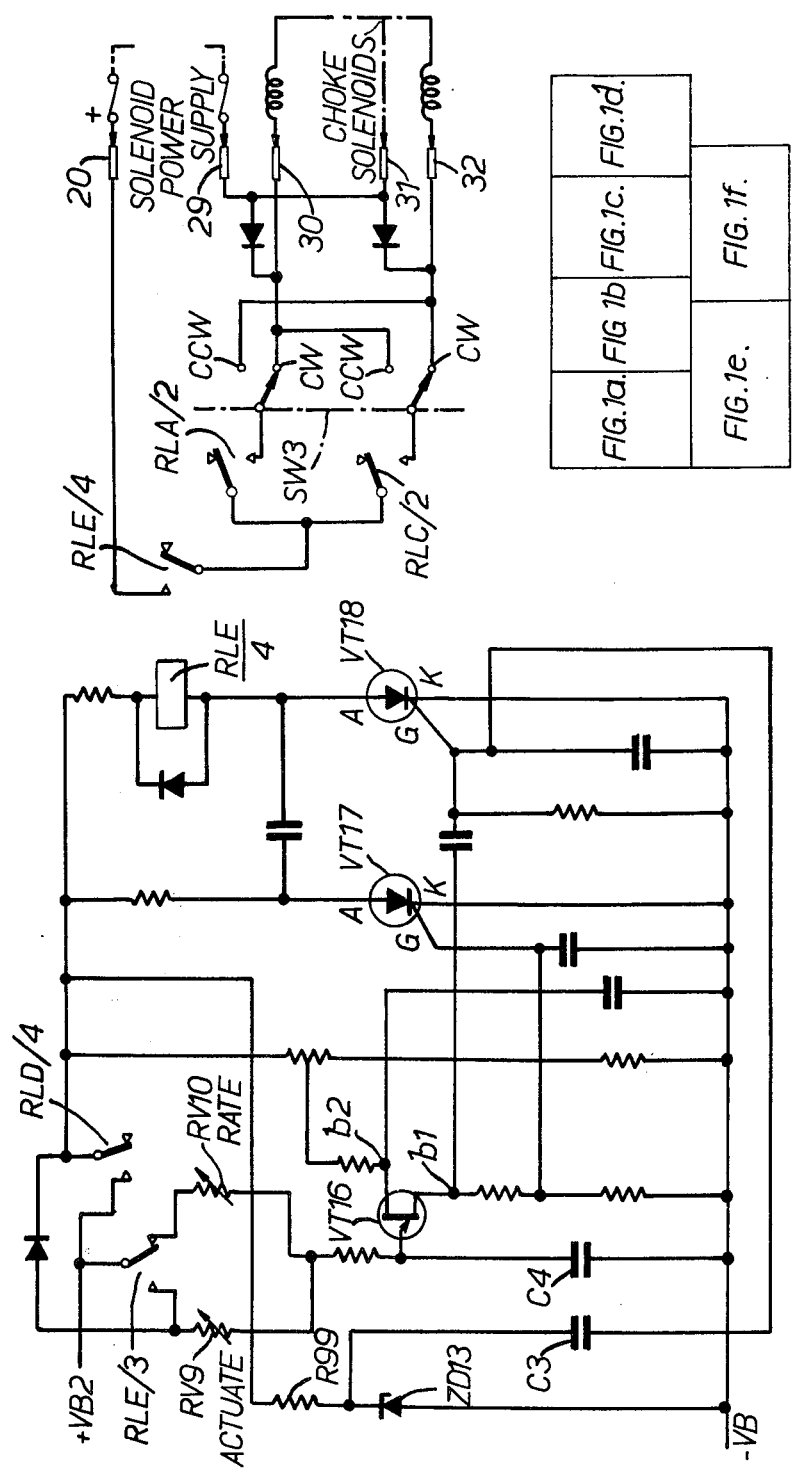

CONTROL OF CHOKES

The invention relates to the control of oil well choke valves.

According to the invention there is provided a well choke control apparatus which comprises means for producing a first electrical signal indicative of a required position of the choke, means for deriving a second electrical signal indicative of the actual position of the choke and first comparator means arranged to be fed with said first and second electrical signals and to control actuation of the choke in the required direction to equalise said electrical signals.

The second electrical signal indicative of the actual position of the choke may also be arranged to be fed as one input to second comparator means, a further input of which is connected to means arranged to produce a third electrical signal indicative of a substantially closed position of the choke, the output of the second comparator means being connected to override control means arranged to prevent further actuation of the choke when the inputs thereto are equal.

The second electrical signal indicative of the actual position of the choke may also be arranged to be fed as one input to third comparator means, a further input of which is connected to means settable to produce a fourth electrical signal indicative of a required maximum open position of the choke, the output of the third comparator means being connected to override control means arranged to prevent further actuation of the choke when the inputs thereto are equal.

The second electrical signal indicative of the actual position of the choke may also be arranged to be fed as one input of both fourth and fifth comparator means, a second input of the fourth comparator means is connected to means arranged to produce a fifth electrical signal indicative of a substantially closed position of the choke, a second input of the fifth comparator means is connected to means arranged to produce a sixth electrical signal indicative of a substantially open position of the choke and the outputs of both fourth and fifth comparator means being connected to second override means arranged to disconnect power from the control apparatus when the inputs to respective fourth or fifth comparators are equal.

The first, second, third, fourth and fifth comparators may comprise operational amplifiers.

The second electrical signal may also be arranged to be fed to indicator means, which may comprise an electrical meter.

The first comparator means may comprise two pairs of buffer amplifiers, the first and second signals being fed as inputs to respective first and second buffer amplifiers of each pair, and three differential amplifiers, the first differential amplifier deriving inputs from one pair of buffer amplifiers and having its output connected to control means to control actuation of the choke in one direction, the second differential amplifier deriving inputs from the other pair of buffer amplifiers and having its output connected to further control means to control actuation of the choke in the other direction, and the third differential amplifier deriving inputs respectively from the first buffer amplifier of one pair and the second buffer amplifier of the other pair and having its output connected to further override means capable of overriding control from the control means and further control means.

The control means and further control means may be connected to means arranged to control a timing circuit which produces timed output pulses for connection to actuation means for the choke.

Said control means, further control means and said further override control means may comprise electromagnetic relays.

The means for producing the first and second electrical signals may comprise a resistive bridge including terminals which, in use, are connected to a potentiometer located on the choke and arranged to be actuated with actuation of the choke.

The foregoing and further features of the invention may be more readily understood from the following description of a preferred embodiment thereof, by way of example, with reference to the accompanying drawings, in which:

FIGS. 1a to 1f show a block schematic circuit diagram of an apparatus for controlling actuation of a well choke with FIG. 1g showing the arrangement of FIGS. 1a to 1f;

The apparatus illustrated is intended for controlling the operation of chokes or valves located at the head of an oil well to control the production therefrom. Such chokes comprise a pair of discs, located in a through flow circuit, and each formed with a pair of circular, diametrically opposed apertures. One of the discs is rotated relative to the other to control alignment of the apertures and hence the flow through the choke. During use as the meeting edges of the apertures become worn by the flow of fluid therethrough, the discs are rotated through 180° and the direction of relative rotation reversed for respective opening and closing of the choke, so utilising the opposite edges of the apertures for the control. Such a choke is commercially available as Type M4 from the Willis Oil Tool Company, Long Beach, Calif., 90807, U.S.A.

Referring now to FIGS. 1a to 1f a multi-turn potentiometer P1 is attached to the choke actuator shaft (not shown) such that the sliding contact moves with the actuator shaft and therefor is indicative of the position thereof. Connections are provided from the sliding contact through terminal 17, via switches SW1 and SW2 in normal and local positions respectively, to provide inputs to two buffer amplifiers A2 and A4. The two ends of potentiometer P1 are connected to a resistive bridge network comprising resistors R8, R9, RV2, R10, R11, R12 and R13.

The bridge voltage is between the junction of a zener ZD3 and a resistor R6 on the one hand and the output of an amplifier A13 on the other hand. The bridge voltage is derived in this manner to permit changes in applied voltage VB without disturbance of the sensed voltage (between the wiper of potentiometer P1 and the wiper of a potentiometer P3).

Figure 1A:
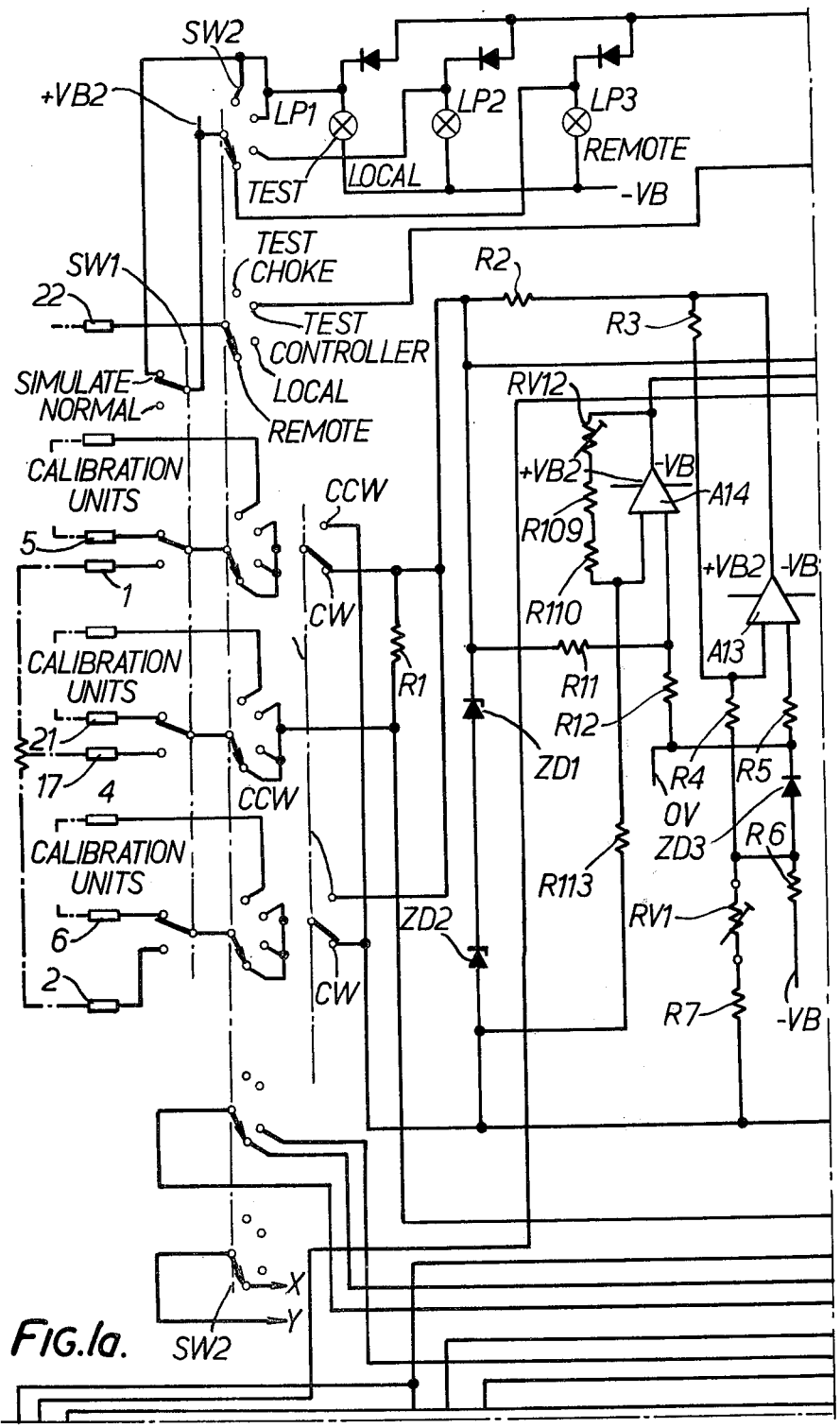
Figure 1B:
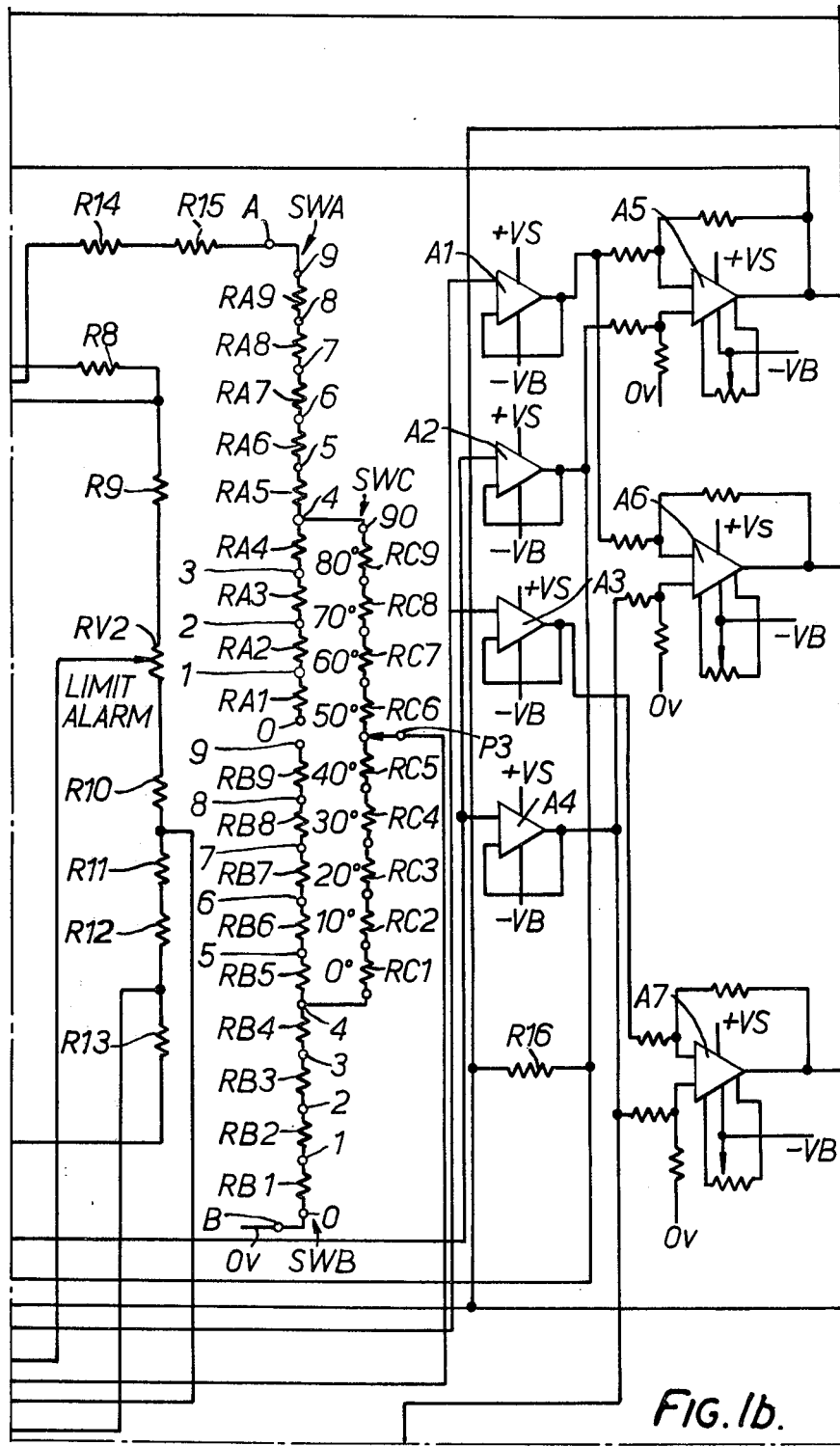
Figure 1C:
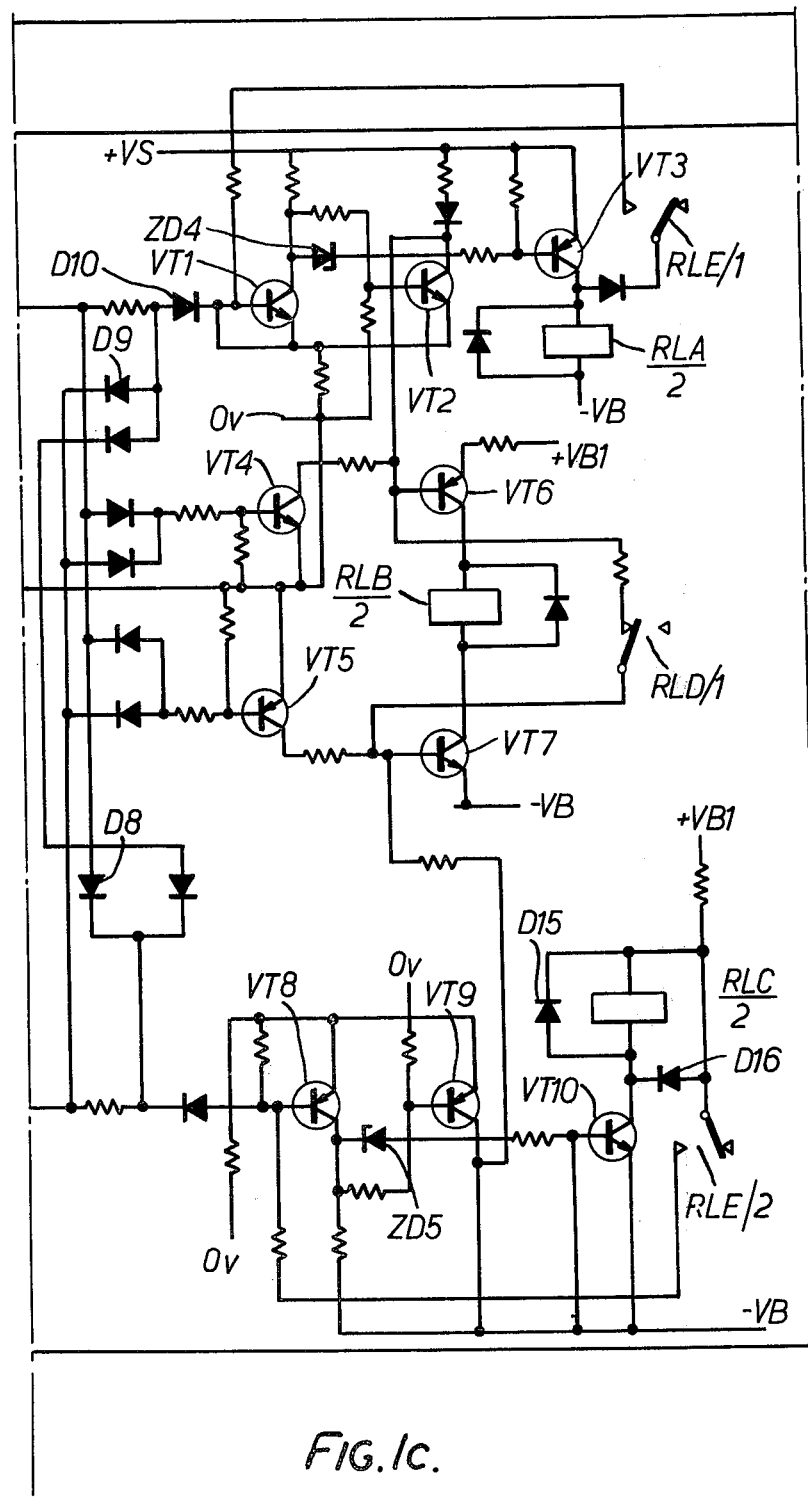
Figure 1D:
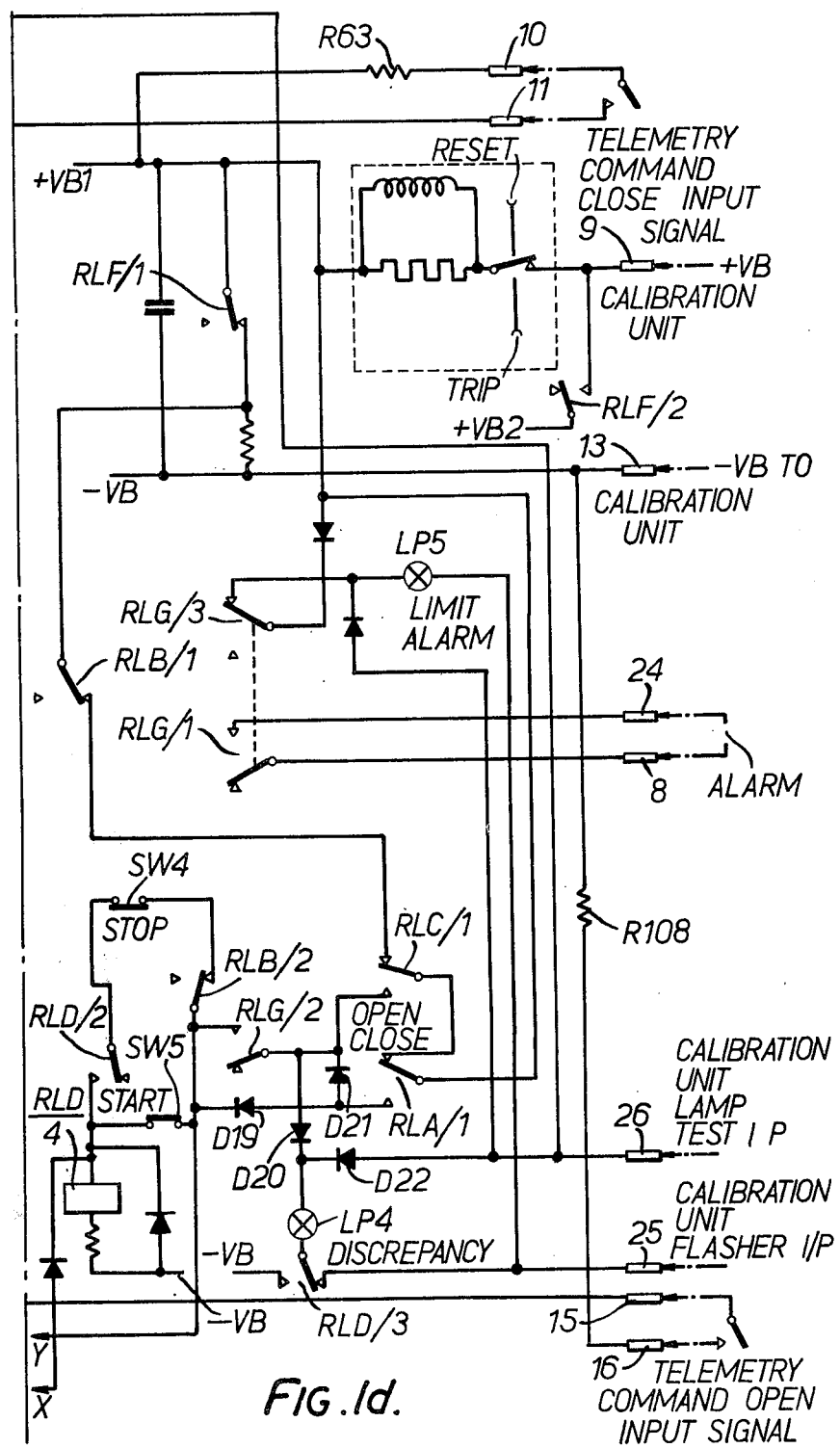
Figure 1E:
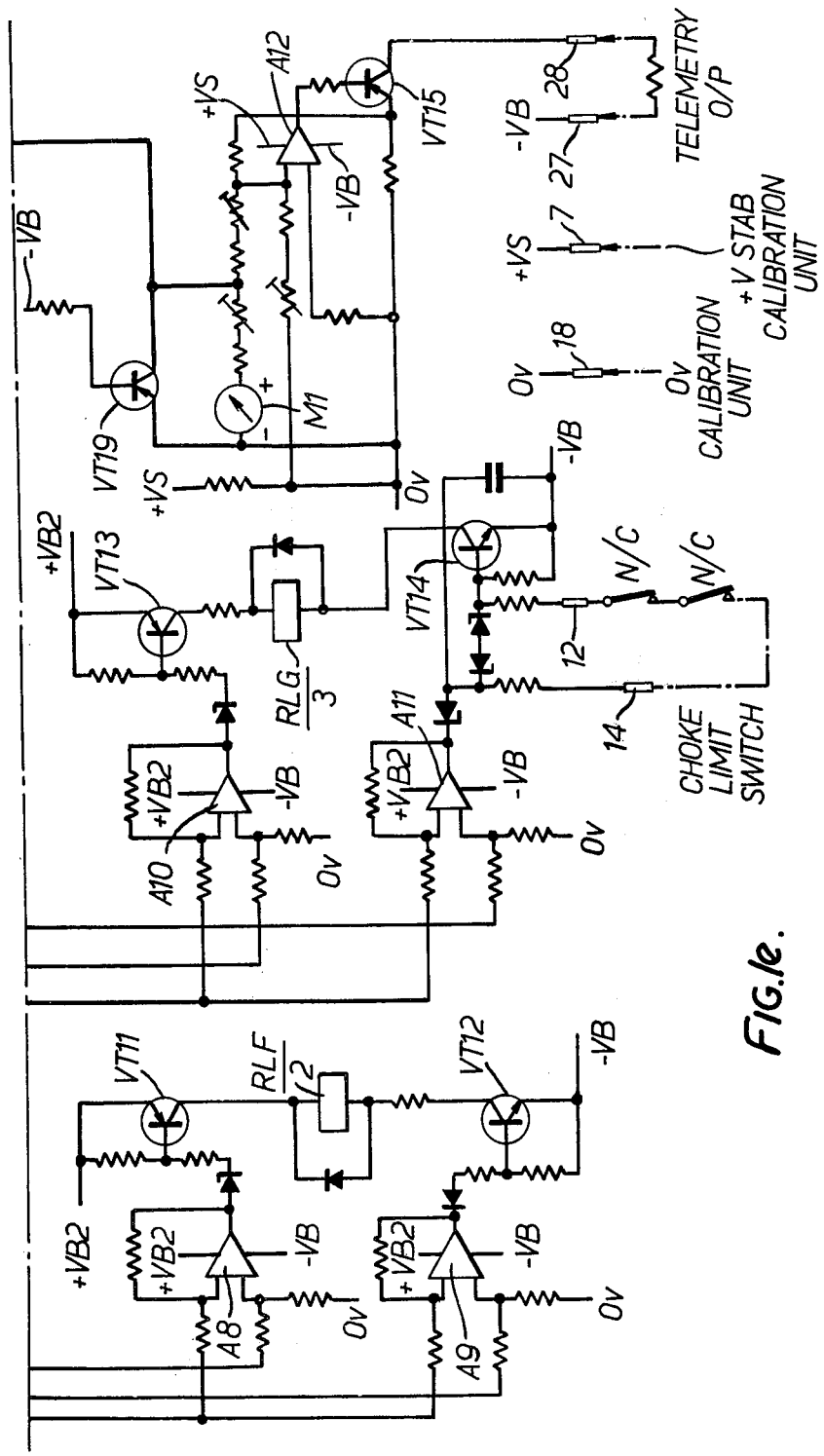
Figure 2:
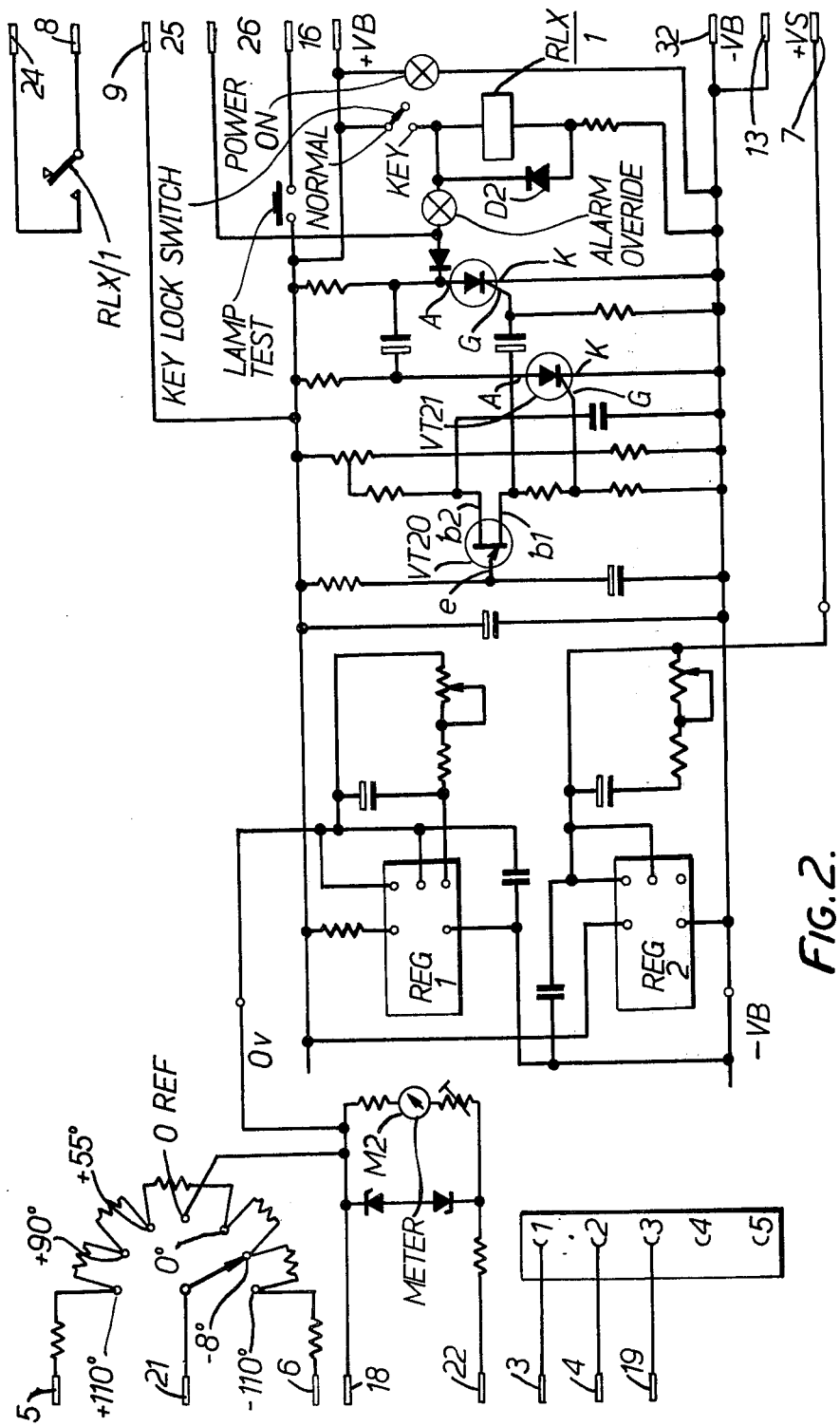
FIG. 2 is a schematic circuit diagram for calibration circuits for use with the apparatus of FIG. 1.

The circuit of the bridge must be such that the outputs of amplifiers A1 and A3 track accurately with the outputs of amplifiers A2 and A4, for reasons that will become apparent, for a normally expected change in battery voltage VB (say 20–28 volts nominal of 24 volts ie.±16% ). To achieve this condition an arbitrary OV (usually at + 12 volts) is used, being created in a calibration unit (FIG. 2). Zener diode ZD3 creates voltage VS1. Amplifier A13 multiplies by −1 and therefor creates, with respect to voltage VS1, a bridge voltage at its output of approximately 2VS1. The actual bridge voltage is further stabilised over and above the effect of zener ZD3 by zeners ZD1 and ZD2.

The series circuit of resistor R2, zeners ZD1 and ZD2, and resistors R7 and RV1 are used to set the output of an amplifier A14. Adjustments of resistors RV1 moves the input of amplifier A14 with respect to OV. The output of amplifier A14 is applied to resistive decades RA1 to 9, RB1 to 9 and RC1 to 9 which are adjusted to produce a signal for setting or altering the position of the choke.

With the resistive decades set at 0° and potentiometer P3 voltage balanced with respect to potentiometer P1 at 0° by use of resistor RV1, then at 90° on both potentiometers and decades the two voltages will always track within the respective accuracies of these components.

This above arrangement allows variations in the D.C. supply to the controller to be absorbed and allows ease of matching choke controllers to choke potentiometers P1 in the field.

The arrangement is shown in a position to provide 54° relative positioning from the 0° at closed position. The choke is moved to provide a balance of the bridge network between potentiometer P1 and the switched decade resistors. Other components of the bridge network will be described hereinafter in relation to calibration.

The centre connection P3 of the switched decade resistors is connected via switch SW2 in LOCAL position to provide inputs to the two buffer amplifiers A1 and A3. The buffer amplifiers have an extremely high input impedance, extremely low output impedance and unity gain to provide stability for the system.

The outputs from buffer amplifiers A1 and A2 are connected as the inputs of a differential amplifier A5. The outputs from the buffer amplifiers A3 and A4 are connected as the inputs of a differential amplifier A7. The outputs from buffer amplifier A1 and A4 are connected as the inputs of a differential amplifier A6.

A positive voltage output from differential amplifier A5 is arranged to acuate a trigger circuit comprised of transistors VT1 and VT2 to cause a further transistor VT3 to conduct and energise a relay RLA. This in turn primes a solenoid actuation circuit in one direction for the choke. A negative voltage output from differential amplifier A7, is arranged to actuate a trigger circuit comprised of transistors VT8 and VT9 to cause a transistor VT10 to conduct and energise a relay RLB. This in turn primes a solenoid actuation circuit in the other direction for the choke. A positive or negative voltage output from differential amplifier A6 switches off a transistor VT4 and VT5 and so allows de-energisation of a normally energised relay RLB which further primes the solenoid actuation circuit for both directions. The outputs from differential amplifiers A5, A6 and A7 are interconnected via a rectifier network so that the outputs from all amplifiers must be the same for the required control operation to take place. Hence it will be seen that amplifiers A1 to A7 comprise a main control comparator for the system and the failure of any one of these will prevent operation of the whole system.

Considering the operation of relay RLA in detail, assume that it is required to move the choke from 50° to 40°. Switch SWC is actuated to position connection P3 to the junction of resistors RC4 and RC5. This causes the voltage signal applied to amplifier A1 to fall and hence its output to amplifier A5 to fall. The output $V_o$ of amplifier A5 is given by:

$$V_o = \frac{RY}{RX}(V2 - V1)$$

Where
V1 is the output from amplifier A1 and
V2 is the output from amplifier A2.

Hence the output from amplifier A5 goes positive to actuate the trigger circuit of transistors VT1 and VT2, turn on transistor VT3 and energise relay RLA. However, should the output from amplifiers A7 go negative due to any fault, such output would be fed via respective rectifier D9 to maintain the base of transistor VT1 negative and prevent the trigger circuit from being operated. In similar manner rectifier D8 provides integrity for correct de-energisation of relay RLC.

Relay RLA becomes energised primes the solenoid circuit for energisation by contact RLA2 closing and contact RLA1 primes a start circuit for the system. Manual actuation of a START button SW5 completes the circuit for energisation of relay RLD as follows: pin 9, circuit breaker "IN", contact RLA1 actuated, contact RLG/2 actuated, switch SW5 to relay RLD. With relay RLD energised contact RLD/2 provides a holding circuit, contact RLD/3 completes a circuit to a lamp LP 4 which indicates a discrepancy between set angle and required angle of the choke, contact RLD/1 causes relay RLB to release and contact RLD/4 completes a circuit to a timing circuit including relay RLE.

With relay RLB becoming de-energised contact RLB/2 completes the holding circuit for relay RLD via a STOP button SW4.

After a predetermined time relay RLE is energised as will be discussed hereinafter.

With relay RLE energised contact RLE/4 closes and completes the solenoid actuation circuit for one step of the solenoid. Relay RLE will be switched on and off to pulse the solenoid actuation circuit and move the choke discs under control of the timing circuit until the bridge network is balanced. When this occurs relay RLA deenergises causing relay RLD to de-energise through contact RLA/2 opening and hence contact RLD/4 opens to break the circuit to the timing circuit. The system then remains in a quiescent condition until a new valve angle is set on the decade resistors. The operation of the circuit is to control the choke in the opposite direction is similar to that described above except that relay RLC is operated instead of relay RLA.

The circuit can be actuated remotely via a telemetry system in which case the switch SW2 is located in the REMOTE position as shown in FIG. 1. This switches out the connection from the decade resistors to buffer amplifiers A1 and A3 and substitutes a connection between a resistor R16 and amplifiers A1 and A3. The resistor R16 is also connected to pins 10 and 11 and to pins 15 and 16 which are provided with a pulsed short circuit via the telemetry system to provide respective positive and negative voltages for closing and opening of the choke. In this mode of operation the imbalance is provided by pulsing amplifiers A5 or A3 positively or negatively by the local supply. The operation of the circuit is similar to that described above except that contacts RLE/1 and 2 maintain an imbalance, so providing an effective hold circuit for respective relay RLC or RLA, until a complete timing cycle of the timing circuit has been completed. In practice a similar arrangement is provided during operation under local control.

The telemetry pulsed external inputs, OPEN or CLOSED, have a duration of approx 500 m Secs. When Switch SW2 is switched to REMOTE, diode D31 bypasses the start button SW5 and holds relay RLD in for a 500 m Sec. period. This time duration is an arbitrary value, being sufficient to enable the controller to latch in and be compatible with other control ways output by the telemetry. Operation of contact RLD/4 causes zener diode ZD13 to conduct via resistor R99. Capacitor C3 transfers the voltage change to thryristor VT18 and relay RLE conducts. Power to relay RLE is switched on temporarily by contact RLD/4 and sustained by contact RLE/3. Once contact RLE/3 has operated resistor RV9 charges capacitor C4 and at the trigger point of transistor VT16 (a unijunction transistor) it gives an output pulse which triggers transistor VT11, and thus turns off transistor VT18. This again isolates POWER to the timing circuit, because contact RLE/3 breaks, until the telemetry again controls the sequence.

The operation of the timing circuit for local operation is the same as for telemetry except in this case contact RLD/4 is sustained. Therefore when contact RLE/3 contact breaks RV10 charges capacitor C4 at a slower rate than resistor RV9 and retriggers transistor VT18, and another pulse is output to the choke actuator which steps one more degree.

The actual position of the choke is indicated on a meter M1 which indicates from 0° to 90° of choke position. The position of the choke is also fed out to pins 27 and 28 to the telemetry system as a signal between 4 and 20 milliamps via an amplifier A12.

Various "fail safe" safety features are built into the system. These basically comprise normally energised relays RLF and RLG which each have contacts to disable the system should either release due to a fault condition occurring.

Relay RLG is maintained energised via two transistors VT13 and VT14 and two limit switches N/C which are mounted on the choke. Transistor VT13 is maintained ON from the output of a differential amplifier A10 which derives one input from the output of amplifier A2 (i.e. effectively from choke potentiometer P1) and a further input from the slider of a potentiometer RV2 of the bridge network which can be set to provide a signal representative of a choke angle of between 50° and 90° as an upper limit. Transistor VT14 is maintained ON from the output of a differential amplifier A11 which derives one input from the output of amplifier A2 and a further input from the junction of two resistors R10 and R11 of the bridge network which produces a signal representative of a choke angle of −3° as a lower limit. Hence if the choke position moves outside the set limits relay RLG is de-energised. This causes the choke actuation solenoid energisation circuit to be broken by contact RLG/2, contact RLG/1 completes an alarm circuit and contact RLG/3 breaks the energisation circuit for relay RLD and completes a circuit to illuminate a limit alarm lamp LP5. Hence the choke locks in position when a limit is exceeded.

Relay RLF is similarly maintained energised via two transistors VT11 and VT12 which are maintained ON from the outputs of respective differential amplifiers A8 and A9 which in turn both derive one input from the output of amplifier A2. Differential amplifier A8 derives a further input from the junction of resistors R12 and R13 of the bridge network which provides a signal representative of a choke angle of +110° as a further upper limit. Differential amplifier A9 derives a further input from the junction of resistors R8 and R9 of the bridge network which provides a signal representative of a choke angle of −110° as a further lower limit. Should these further limits be exceeded a serious fault must have occurred and therefore relay contacts RFL/1 and 2 are utilised to switch off the power supply to the circuit and again lock the choke in position.

A switch SW3 is provided to reverse the direction of operation of the choke.

Referring now to FIG. 2 there is shown a circuit diagram of a calibration unit which is associated with a number of control circuits as illustrated in FIG. 1. A free running oscillator circuit including transistors VT20, VT21 and VT22 is arranged to provide a signal at pin 25 for flashing lamp LP 4 of FIG. 1 if one of the limits has been exceeded.

By use of switches SW1 and SW2 (FIG. 1), the like numbered pins of FIGS. 1 and 2 being permanently interconnected, various resistors interconnected between pins 5, 6 and 21 and a meter M2 are interconnected to facilitate calibration and checking the FIG. 1 bridge network by adjustment of potentiometers RV12, and RV1 of the bridge network. The various limit positions can be set and/or checked and the whole arrangement recalibrated should a new choke potentiometer P1 have to be provided.

The control circuitry in principle centres on buffers A1 to A4 comparators A5 to A7, and the trigger circuits driving relays RLA, RLB, RLC.

Buffers A1 and A2 drive comparators A5. (CLOSE).
Buffers A3 and A4 drive comparators A7. (OPEN).
This gives two independent comparison paths.

The third comparator A6 derived from A1 and A4, i.e. input from the two independent paths to detect balance.

The outputs of comparators A5, A6, A7 are suitably coupled into the three trigger circuits such that discrepancies between outputs inhibit the three trigger circuits. This feature is desired as a safety interlock to stop the choke inadvertently driving fully open, under fault conditions, causing possible damage to the operation of the oil well. Two other trips are external switches, which may fail, and a simple electronic limit are built into the device. The circuitry is such that the choke controller cannot inadvertently drive in reverse direction and thus fully open the well. The circuitry is such that the controller would not function if the power trips, thus holding the choke in a safe working state.

Figure 3:
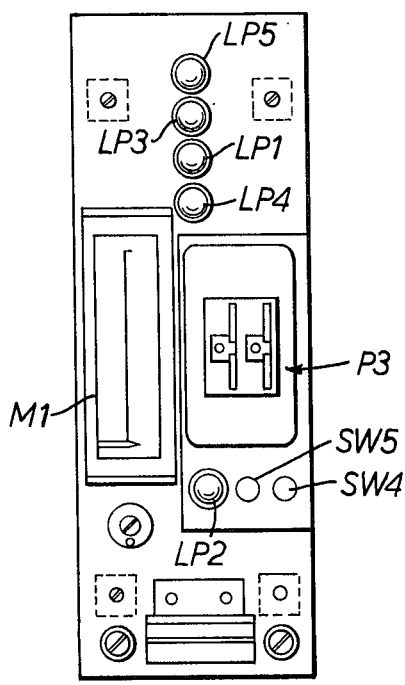
FIG. 3 is a front elevational view of a housing for the apparatus of FIG. 1.
Figure 4:
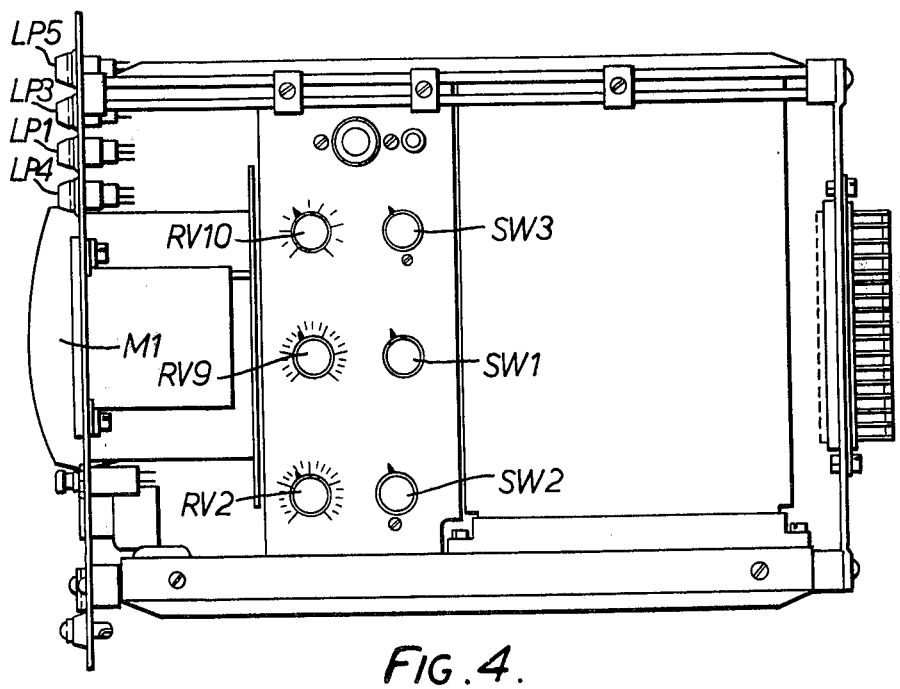
FIG. 4 is a side elevational view of the housing of FIG. 3.

FIGS. 3 and 4 show a housing for the components of FIG. 1 which is normally mounted in a rack (not shown), to be adjacent similar further apparatus for further chokes of further wells in a field. The calibration unit of FIG. 2 is mounted in a similar housing and associated with a number of units as shown in FIGS. 3 and 4. The apparatus is particularly suitable for offshore wells where it can be located on an oil production platform in a non-hazardous environment. The apparatus can be actuated by staff on the platform or remotely via the telemetry from on shore.

The start and stop switches SW5 and SW4 together with decade resistance control switches P3 are located on the face of the housing. The set zero and balance potentiometers and the indicator lamps are all also mounted on the face of the housing. The remaining controls are made less accessible on the side of the housing to prevent inadvertent operation of these devices.

What is claimed is:

1. A well choke control apparatus comprising:
   a. means for producing a first electrical signal indicative of a required position of the choke;
   b. means for deriving a second electrical signal indicative of the actual position of the choke;
   c. first comparator means, the first comparator means being arranged to be fed with said first and second electrical signals and to control actuation of the choke in the required direction to equalize said electrical signals;
   d. second comparator means;
   e. means settable to produce a third electrical signal indicative of a predetermined closed position of the choke; and
   f. override control means;
   the second electrical signal indicative of the actual position of the choke is also arranged to be fed as one input to the second comparator means, a further input of which is connected to the means settable to produce the third electrical signal, the output of the second comparator means being connected to said override control means which is arranged to prevent further actuation of the choke when said second and third signals are equal.

2. A well choke control apparatus as claimed in claim 1 further comprising:
   a. third comparator means;
   b. means settable to produce a fourth electrical signal indicative of a required predetermined open position of the choke; wherein the second electrical signal indicative of the actual position of the choke is also arranged to be fed as one input to said third comparator means, a further input of which is connected to said means settable to produce the fourth electrical signal, the output of the third comparator means being connected to said override control means arranged to prevent further actuation of the choke when said second and fourth signals are equal.

3. A well choke control apparatus as claimed in claim 2 further comprising:
   a. fourth comparator means;
   b. fifth comparator means;
   c. means arranged to produce a fifth electrical signal representative of a substantially closed position of the choke;
   e. means arranged to produce a sixth electrical signal representative of a substantially open position of the choke, and
   e. second override means, wherein the second electrical signal indicative of the actual position of the choke is also arranged to be fed as one input of both said fourth and fifth comparator means, a second input of the fourth comparator means is connected to said means arranged to produce the fifth electrical signal, a second input of the fifth comparator means is connected to said means arranged to produce the sixth electrical signal and the outputs of both fourth and fifth comparator means being connected to said second override means arranged to disconnect power from the control apparatus when the inputs to respective fourth or fifth comparators are equal.

4. A well choke control apparatus comprising:
   a. means for producing a first electrical signal indicative of a required position of the choke;
   b. means for deriving a second electrical signal indicative of the actual position of the choke; and
   c. first comparator means, said first comparator means comprising two pairs of buffer amplifiers, the first and second signals being fed as inputs to respective first and second buffer amplifiers of each pair, and three differential amplifiers, the first differential amplifier deriving inputs from one pair of buffer amplifiers and having its output connected to control means to control actuation of the choke in one direction, the second differential amplifier deriving inputs from the other pair of buffer amplifiers and having its output connected to further control means to control actuation of the choke in the other direction, and the third differential amplifier deriving inputs respectively from the first buffer amplifier of one pair and the second buffer amplifier of the other pair and having its output connected to third override control means capable of overriding control from the control means and further control means.

5. A well choke control apparatus as claimed in claim 4, wherein the control means and further control means are connected to means arranged to control a timing circuit which produces timed output pulses for connection to actuation means for the choke.

6. A well choke control apparatus as claimed in claim 5 wherein said control means, further control means and said further override control means comprise electromagnetic relays.

7. A well choke control apparatus as claimed in claim 4 including means for operating the apparatus from a remote location by disconnecting the means for producing said first electrical signal and substituting remotely produced control pulses therefor.

8. A well choke control apparatus comprising:
   a. means for producing a first electrical signal indicative of a required position of the choke;
   b. means for deriving a second electrical signal indicative of the actual position of the choke, the means for producing the first and second signals comprising a resistive bridge including terminals which, in use, are connected to a potentiometer located on the choke and arranged to be actuated with actuation of the choke;
   c. means for calibrating said means for producing the first and second signals; and
   d. first comparator means, the first comparator means being arranged to be fed with said first and second electrical signals and to control actuation of the choke in the required direction to equalize said electrical signals.

* * * * *